United States Patent [19]

Kawamura

[11] Patent Number: 4,905,729
[45] Date of Patent: Mar. 6, 1990

[54] CONSTANT PRESSURE TYPE DELIVERY VALVE FOR FUEL INJECTION PUMP

[75] Inventor: Kazuya Kawamura, Higashimatsuyama, Japan

[73] Assignee: Diesel Kiki Co., Ltd., Tokyo, Japan

[21] Appl. No.: 873,374

[22] Filed: Jun. 12, 1986

[30] Foreign Application Priority Data

Jun. 13, 1985 [JP] Japan .................. 60-89453[U]

[51] Int. Cl.⁴ .................................. F16K 15/04
[52] U.S. Cl. ...................... 137/539.5; 137/543.17; 251/284
[58] Field of Search ............ 137/539.5, 543.17; 251/284

[56] References Cited

U.S. PATENT DOCUMENTS

| | | | |
|---|---|---|---|
| 1,370,483 | 3/1921 | Powell | 251/284 X |
| 1,553,184 | 9/1925 | Mueller | 137/543.17 |
| 2,481,713 | 9/1949 | Bertea | 137/539.5 X |
| 3,544,065 | 12/1970 | Mercier | 251/284 |
| 3,559,678 | 2/1971 | Donner | 137/539.5 X |
| 3,799,194 | 3/1974 | Bedo et al. | 137/539.5 |

*Primary Examiner*—John Rivell
*Attorney, Agent, or Firm*—John E. Toupal; Harold G. Jarcho

[57] ABSTRACT

The invention is a check valve including a valve housing defining a chamber, an inlet and an outlet; a spring holder retained in the chamber and defining a passage providing fluid communication between the chamber and the outlet, one end of the passage opening into the chamber and defining a stop surface; a valve body disposed in the chamber and movable between a closed position closing the inlet and an open position providing fluid communication between the chamber and the inlet, the valve body defining an abutment surface engaged by the stop surface upon movement of the body into the open position in response to a predetermined fluid pressure at the inlet, the abutment surface and the stop surface being shaped and arranged to provide when engaged fluid communication paths between the chamber and the passage opening; and a spring seated between the holder and the body and exerting a force tending to hold the body in the closed position. The provision of engaged stop and abutment surfaces that provide fluid communication paths permit both simplification and strengthening of the spring holder.

4 Claims, 2 Drawing Sheets

CONSTANT PRESSURE TYPE DELIVERY VALVE FOR FUEL INJECTION PUMP

BACKGROUND OF THE INVENTION

The present invention relates to a constant pressure delivery valve for a fuel injection pump in an internal combustion engine.

Known in the prior art for use with a high pressure, injection type fuel injection pump is a constant pressure delivery valve in which a pressure wave produced when a fuel injection valve is closed is attenuated to prevent the occurence of a secondary injection. Such a valve is disclosed, for example in Japanese Utility Model Application, Laid-Open No. 63358/83. This constant pressure type delivery valve system includes a spacer block 3 and a valve holder 5, as shown in FIG. 3. The spacer block 3 is fitted into a large-diameter cylindrical portion 25 on the upper end side of a plunger barrel 2 forming a plunger chamber 12, and the valve holder 5 is supported on a surface 4 of the block 3. A flange 24 integrally formed on an intermediate portion of the valve holder 5 is connected by bolts (not shown) to an injection pump body 26 into which the plunger barrel 2 is fitted. Formed in the spacer 3 and the valve holder 5 are discharge passages 22, 6 connected between the plunger chamber 12 and a delivery port 7 in the valve holder 5, and return passages 8, 23 connected between the delivery port 7 and the plunger chamber 12. The delivery port 7 is connected to a fuel injection valve (not shown) mounted on a cylinder head of an internal combustion engine (not shown) through a fuel injection pipe (not shown).

A check valve 10 is inserted in and connected to the discharge passage 22, and an orifice 9 and a check valve 40 are provided in and connected to the return passage 8 in the valve holder 5. The check valves 10 and 40, slightly different in dimension but similarly constructed, are inserted to provide opposite directions of fluid flow. Included in each check valve 10 and 40 is a spring holder 18, a valve body 14 having a ball 13 coupled thereto, and a spring 15 for biasing the ball 13 toward a closed position.

A description will be made only of the check valve 40 with the understanding that the description applies also to the check valve 10. A large diameter cylindrical portion 28 forms a chamber opening into the return passage 23, the cylindrical portion 28 being formed with a threaded hole 19. The spring holder 18 has an externally threaded portion 19 engaged with the tapped hole 19. As shown in FIG. 4, the spring holder 18 has a small diameter, cylindrical shaft portion 18b extending from a shoulder 32 that supports one end of the spring 15. Formed in the holder 18 is a hexagonal tool hole 20 communicating with the return passage 23, a central passage 33 extending in an axial direction of the spring 15 and communicating radial passages 17. Accordingly, the chamber formed by the cylindrical portion 28 is connected to the return passage 23 of the spacer 3 through the passages 17 and 33 and the tool hole 20.

The valve body 14 is provided with a shoulder 35 for supporting an opposite end of the spring 15. Firmly pressed into a semi-spherical depression 31 in an end of the valve body 14 is the ball 13. An edge portion 31a between the ball 13 and the valve body 14 is integrally caulked. The ball 13 is urged by the force of the spring 15 toward a closed position that closes the return passage 8.

When the plunger (not shown) fitted into the plunger barrel 2 is pushed up, fuel in the plunger chamber 12 enters the discharge passage 22 producing a fluid pressure that forces the valve body 14 of the check valve 10 upwardly against the force of the spring 15 into an open position. This allows fuel to enter the cylindrical portion 28 and pass through the passages 17 and 33, the tool hole 20 and the discharge passage 6 in the valve holder 5. The fuel enters a fuel injection valve (not shown) from the delivery port 7 through a fuel injection pipe (not shown) and is injected into a cylinder (not shown). When the plunger moves upward to a level above the effective stroke, pressure in the plunger chamber 12 rapidly lowers, causing the check valve 10 to close and terminate the injection of fuel from the fuel injection valve.

When the plunger subsequently moves downwardly within the range of the effective stroke, pressure in the plunger chamber 12 lowers, and therefore the check valve 40 of the return passage 8 is forced to open against the force of the spring 15. Accordingly, fuel is slowly taken back into the plunger chamber 12 through the orifice 9. This return of fuel is attenuated by the orifice 9 and the check valve 40 to thereby prevent the occurrence of caviation in the fuel injection valve and the check valve 40. Opening movement of the valve body 14 of the check valve 40 against the force of the spring 15 causes the pressure wave from the fuel injection valve to attenuate, thus preventing the secondary injection resulting from reflection of the pressure wave.

The maximum stroke of the valve body 14 is established by the clearance between the closed valve body 14 and the end of the spring holder 18. Upon full opening of the valve body 14 when the abutment surface 14a thereon abuts with the stop surface 18a on the spring holder 18, the return passage 8 remains connected to the passage 23 of the spacer 3 through the cylindrical chamber portion 28, the passages 17 and 33 and the tool hole 20.

In the above described check valve 40, the axial passage 33 connected to the tool hole 20 of the spring holder 18 and the radial passages 17 crossed thereto require expensive machining. In addition, when the valve body 14 strikes the stop surface 18a on the spring holder 18, damage can occur to the small diameter shaft portion 18b of the spring holder 18 that engages and guides the inner surface of the cylindrical, spiral spring 15. The possibility of damage is enhanced by the weakness created in the shaft portion 18b by the radial passages 17. Also, damage to the spring 15 can result from the undesirable friction created between the open edge portions of the radial passages 17 and the spring 15.

The object of the present invention, therefore, is to provide a less expensive and more sturdy constant pressure delivery valve for a fuel injection pump.

SUMMARY OF THE INVENTION

The invention is a check valve including a valve housing defining a chamber, an inlet and an outlet; a spring holder retained in the chamber and defining a passage providing fluid communication between the chamber and the outlet, one end of the passage opening into the chamber and defining a stop surface; a valve body disposed in the chamber and movable between a closed position closing the inlet and an open position providing fluid communication between the chamber and the inlet, the valve body defining an abutment surface engaged by the stop surface upon movement of the body into the open position in response to a predetermined fluid pressure at the inlet, the abutment surface and the stop surface being shaped and arranged to provide when engaged fluid communication paths between the chamber and the passage opening; and a spring seated between the holder and the body and exerting a force tending to hold the body in the closed position. The provision of engaged stop and abutment surfaces that provide fluid communication paths permit both simplification and strengthening of the spring holder.

According to specific features of the invention, the spring is wound in a cylindrical spiral, the spring holder defines an outer cylindrical surface engaged by the inner surface of the spring, and the passage is axially aligned with the outer cylindrical surface. This arrangement provides a structurally desirable valve.

According to another feature of the invention, the spring holder comprises a plurality of spaced apart ridges having outer surfaces that define the stop surface, and the spaces between the ridges define the fluid communication paths. Provision of the fluid communication paths is simplified by this arrangement.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 4:
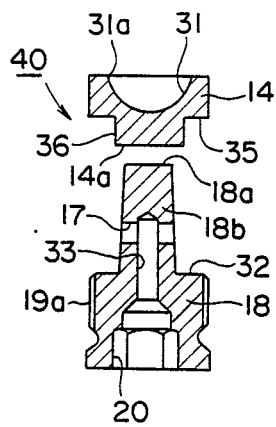
FIG. 4 is a schematic sectional view of the constant pressure delivery valve shown in FIG. 3.
Figure 2:
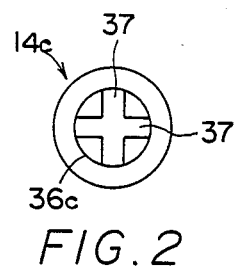
FIG. 2 is a schematic bottom view of a valve body of the constant pressure delivery valve shown in FIG. 1.
Figure 1:
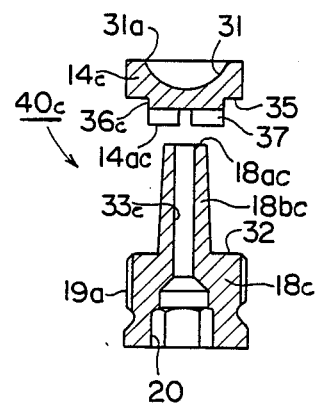
FIG. 1 is a schematic sectional view of a constant pressure delivery valve for a fuel injection pump in accordance with the present invention.
Figure 3:
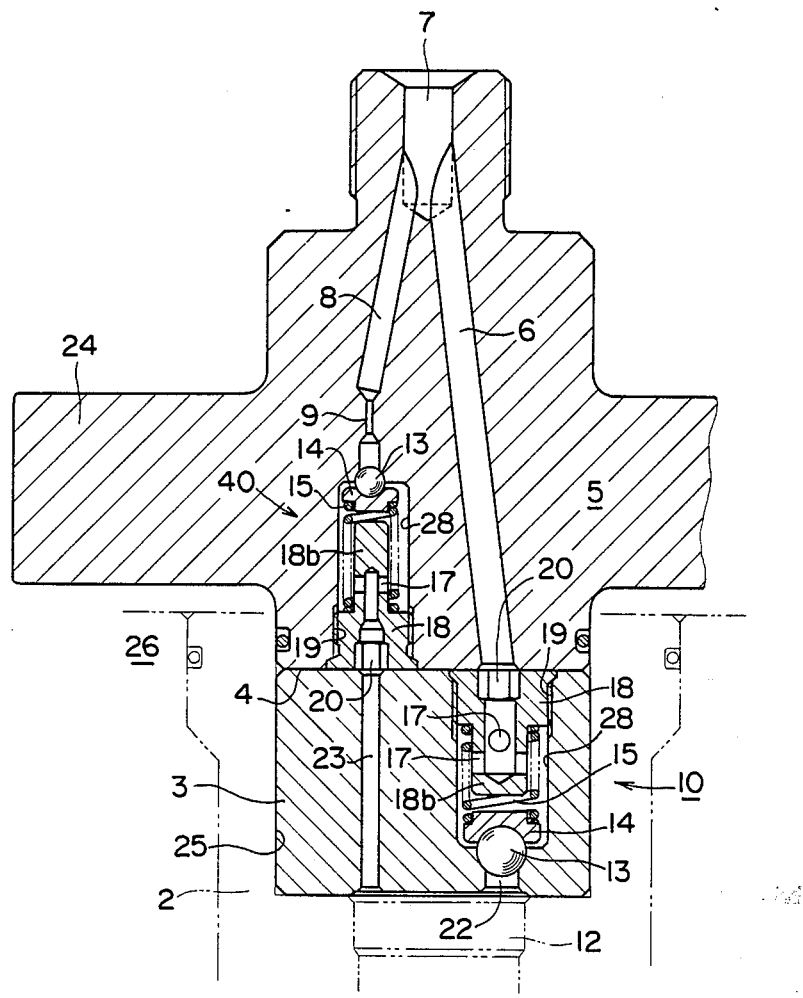
FIG. 3 is a schematic sectional view showing essential parts of a fuel injection pump provided with a conventional constant pressure delivery valve.

Illustrated in FIGS. 1 and 2 is a check valve 40c according to the invention and for replacing the check valves 10 and 40 shown in FIGS. 3 and 4. Portions of the valve 40c identical to those of the valves 10 and 40 bear the same reference numerals. A spring holder 18c is provided with a threaded portion 19a for threadedly engaging a tapped hole. Provided on the holder 18c is a small diameter guide shaft portion 18bc extending from a shoulder 32. A hexagonal tool hole 20 is formed in one end of the spring holder 18c, and a central passage 33c extends axially between an opposite stop surface end 18ac thereof and the hole 20. Formed in one end of a valve body 14c is a semi-spherical depression 31 that receives a ball 13. An opposite end of the body 14c defines a small diameter shaft portion 36c projecting from a shoulder 35. Formed in the shaft portion 36c are cross-shaped grooves 37 that separate ridges terminating with outer abutment surfaces 14ac. Such a valve body 14c may be integrally formed by forging. A ball 13 (FIG. 3) is brought into engagement with the depression 31, and an open edge portion 31a thereof is caulked and integrally joined to prevent disengagement. In addition, a spring 15 (FIG. 3) is interposed between the shoulder 32 on the spring holder 18c and the shoulder 35 on the valve body 14c.

While in the above described embodiment, the cross-shaped grooves 37 are provided in the end of the valve body 14c, it should be noted that grooves of other shape can be forged. The number, depth and width of the grooves 37 are determined so that a suitable fluid communication path is provided with the abutment surfaces 14ac of the valve body 14a abutting against the stop surface 18ac on the spring holder 18c. Accordingly, if Y-shaped grooves are provided in place of the cross-shaped grooves 37, the area of contact with the surface 18ac can be increased, which is advantageous in terms of strength.

OPERATION

In use, the check valve 40c replaces the valves 10 and 40 in the system shown in FIG. 3. When the body 14c is forced back against the force of the spring 15 to open the valve, the abutment surfaces 14ac engage the stop surface 18ac of the spring holder 18 to restrict the lift of the valve body. The fluid communication paths provided by the cross-shaped grooves 37, permit fuel to pass by the periphery of the valve body 14c and flow into the axial passage 33c in the spring holder 18c. Since the spring holder 18c contains no structurally weakening radial passages, its strength is increased. In addition, the smooth peripheral surface of the small diameter shaft portion 18bc performs the function of smoothly guiding expansion of the spring 15 and eliminates the undesirable friction that occurs between the spring and the edges of the radial passages 17 in the prior art valve of FIG. 4.

Obviously, many modifications and variations of the present invention are possible in light of the above teachings. It is to be understood, therefore, that the invention can be practiced otherwise than as specifically described.

What is claimed is:

1. A check valve comprising:

valve housing means defining a chamber; an inlet and an outlet;

a spring holder retained in said chamber and defining an outer cylindrical surface and a passage axially aligned and coextensive therewith, said passage providing fluid communication between said chamber and said outlet and one end of said passage opening into said chamber and defining a stop surface;

a valve body means disposed in said chamber and movable between a closed position closing said inlet and an open position providing fluid communication between said chamber and said inlet, said valve body means defining an abutment surface engaged by said stop surface upon movement of said valve body means into said open position in response to a predetermined fluid pressure at said inlet, said abutment surface and said stop surface being shaped and arranged to provide when engaged fluid communication paths between said chamber and said passage opening; and a spring wound in a cylindrical spiral and seated between said holder and said valve body means, said spring having an inner surface engaged by said outer cylindrical surface of said spring holder and exerting a force tending to hold said body in said closed position.

2. A check valve according to claim 1 wherein said valve body means comprises a plurality of spaced apart ridges having outer surfaces that define said abutment surface, and wherein the spaces between said ridges define said fluid communication paths.

3. A check valve according to claim 2 wherein said chamber is cylindrical and defines internal threads that engage outer threads on said spring holder.

4. A check valve according to claim 3 wherein said cylindrical chamber is axially aligned with said outer cylindrical surface of said spring holder.

* * * * *